United States Patent Office 3,433,017
Patented Mar. 18, 1969

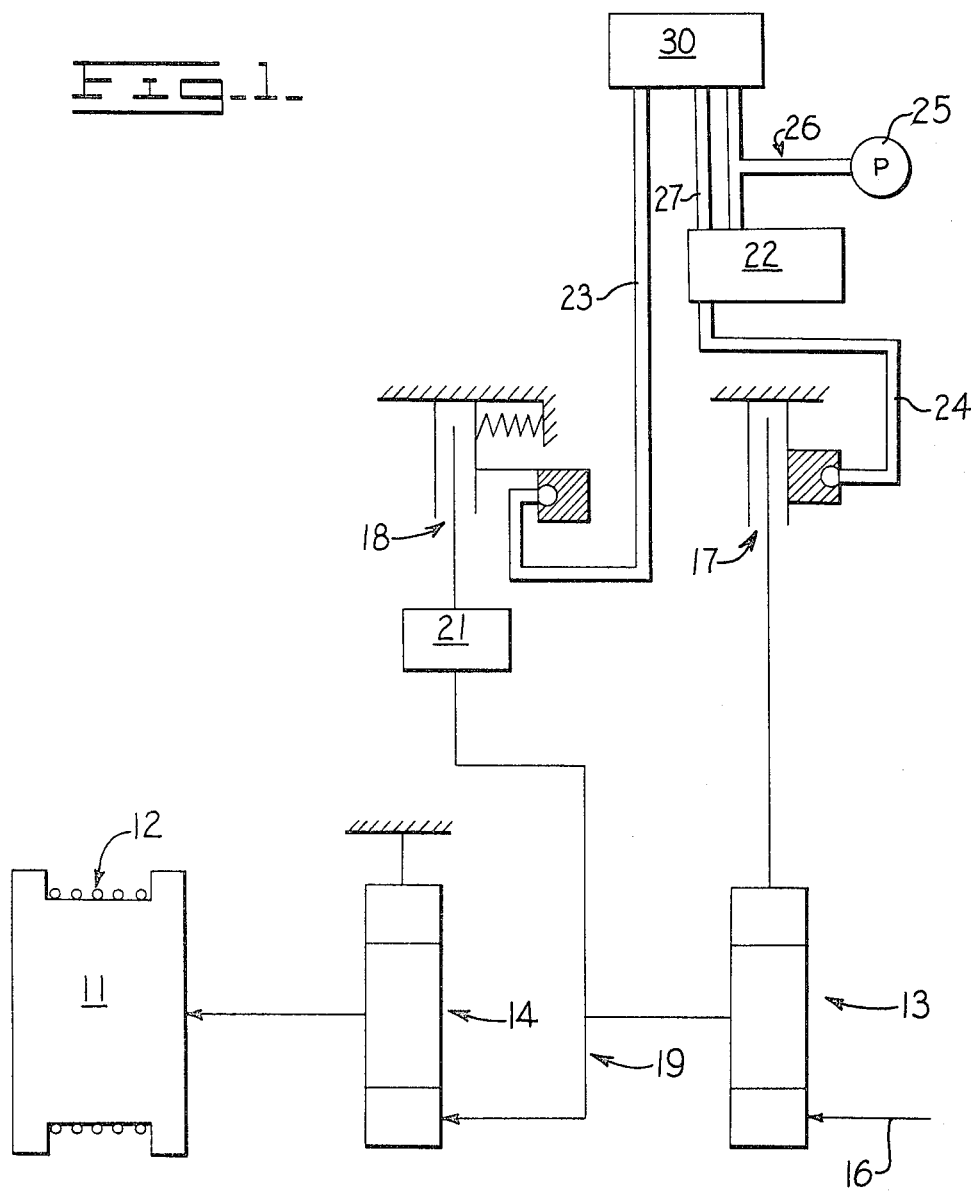

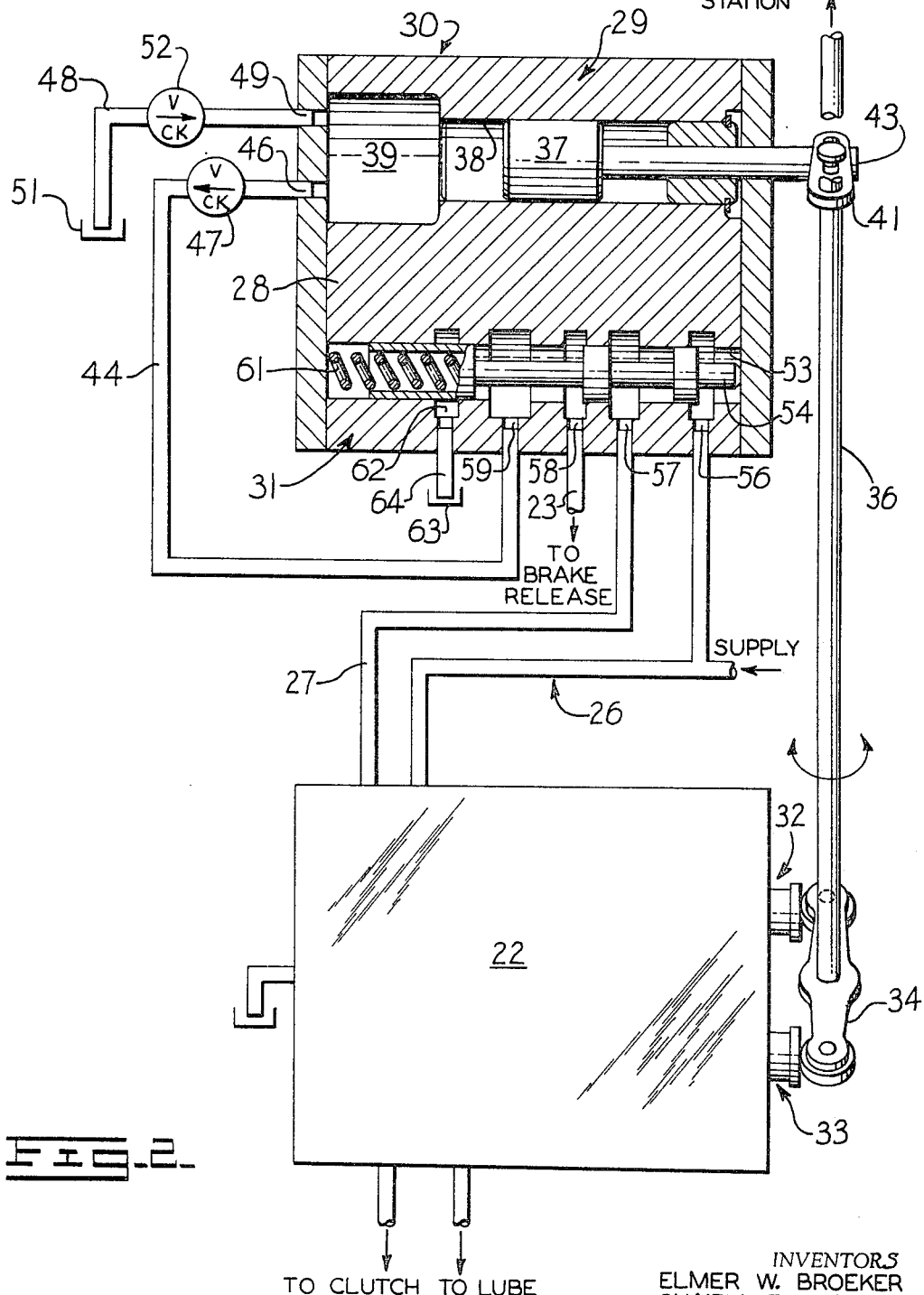

3,433,017
SAFETY OVERRIDE FOR HYDRAULIC CABLE CONTROL UNIT
Elmer W. Broeker, Washington, and Shairyl I. Pearce, East Peoria, Ill., assignors to Caterpillar Tractor Co., Peoria, Ill., a corporation of California
Filed Nov. 2, 1967, Ser. No. 680,208
U.S. Cl. 60—52            5 Claims
Int. Cl. F15b *11/16;* B66d *1/54*

ABSTRACT OF THE DISCLOSURE

A safety override in a cable control unit having a control valve regulating fluid flow to a brake. The safety override has an auxiliary pump manually operated by the actuating lever for the control valve to supply fluid for brake release upon a pressure failure of its primary fluid source. A relay valve has a spring urging it into a position to communicate the auxiliary pump with the brake. Fluid pressure from the source overcomes the spring so that the relay valve communicates the control valve to the brake and the auxiliary pump to drain.

*Cross-reference to related U.S. patents*

The present invention is described with particular reference to a cable control unit of the type set forth in U.S. patent application, Ser. No. 680,085, entitled, Control Valve for Cable Control Unit, and filed together with the present application by E. W. Broeker et al. on Nov. 2, 1967.

Pressure failure is generally undesirable in hydraulic operating circuits and may be an acute problem in certain situations. For example, scrapers and tractors commonly have cable control units for positioning their several adjustable components. Hydraulic circuits are commonly employed on such vehicles for operating the cable control units as well as the vehicle steering and braking apparatus. In the event of a hydraulic pressure failure such as would result from a stalled engine, one technique of averting loss of vehicle control is for the operator to drop the bowl or blade to the ground so that it acts as a brake to stop the vehicle. However, in these vehicles, lowering of the bowl or blade is normally accomplished by hydraulic release of a brake which permits a cable drum to reel out cable holding the bowl or blade. Considerable mechanical energy must be directly exerted on the brake to release the drum when a pressure failure occurs so that the above technique becomes difficult, if not impossible.

The present invention overcomes problems of the type described above by providing an auxiliary pump for providing fluid under pressure to hydraulically actuated means upon failure of pressure from its normal fluid source.

In vehicles of the type set forth above, an operator may at least temporarily maintain hydraulic pressure by manual operation, for example, of the auxiliary pump when the normal fluid source fails to provide hydraulic pressure.

It is accordingly an object of the present invention to provide auxiliary pumping means for supplying fluid pressure to hydraulically actuated means in case of hydraulic pressure failure from a primary fluid source.

Since the primary fluid source may permit fluid draining or leakage in the event of pressure failure, it is a further object to provide a relay valve in association with the auxiliary pump to automatically isolate the source and communicate the auxiliary pump directly to the hydraulically actuated means in the event of pressure failure.

Other objects and advantages of the present invention are made apparent in the following description with reference to the accompanying drawings wherein:

FIG. 1 is a schematic illustration of a hydraulically operated cable control unit; and FIG. 2 is a central sectioned view of the override apparatus of the present invention associated with a control valve of the cable control unit of FIG. 1.

The override assembly of the present invention is described below with particular reference to a cable control unit to insure actuating fluid in a normally engaged brake. However, it will be apparent from the following description that the override may also be employed with similar hydraulically actuated brakes, clutches and the like as a safety measure to insure continued operation in the event of a pressure failure.

A cable control unit is illustrated in FIG. 1 for controlling operation of a cable drum 11 to wind in or reel out cable illustrated at 12. Such a unit is more fully disclosed in the patent application referenced above and comprises first and second planetary gear assemblies 13 and 14 respectively for transmitting power from an input shaft 16 to the cable drum. A normally disengaged clutch 17 is associated with the first planetary gear assembly and is engaged by hydraulic pressure for transmission of power through the planetary gears to wind in cable on the drum. A normally engaged brake 18 is connected with the interconnecting drive 19 between the planetry gear assemblies by means of an overrunning clutch 21. The brake normally prevents reeling out of cable from the drum but does not interfere with winding in of cable in response to actuation of the clutch 17. The brake 18 is released by hydraulic pressure to permit reeling out of cable from the drum according to gravity force. A control valve 22 has two valve sections (see FIG. 2) for supplying hydraulic fluid to the brake and clutch through conduits 27 and 24 respectively for engagement of the clutch or release of the brake. The conduit 27 is in communication with the brake 18 by means of an assembly 30 and another conduit 23 as described in greater detail below.

To permit continued operator control over the cable drum in the event of a pressure failure from a primary fluid source 25, the present invention provides an override assembly 30 which is associated with the fluid source 25, the control valve 22, and the brake 18. The override assembly permits the operator to hydraulically release the brake in the event of a pressure failure which, for example, could result from stalling of an engine (not shown) driving the primary fluid source 25. Fluid from the primary source is communicated to both the control valve and the override assembly by a conduit 26. With fluid pressure normally present in the conduit 26, fluid flow to the brake is controlled by the valve 22 and follows a path comprising the control valve 22, interconnecting conduit 27, the override assembly 30 and the conduit 23.

The override assembly is illustrated in greater detail in FIG. 2 along with the control valve 22 and comprises a common housing 28 having an auxiliary pump 29 and a relay valve 31. The relay valve controls communication from the primary source and the control valve 22 or the auxiliary pump with the brake. The control valve 22 has valve portions generally indicated at 32 and 33 for controlling fluid flow to the brake and clutch respectively. The control valve portions are both operable by a rotatable lever 34 which is controlled by the operator through linkage indicated at 36. The auxiliary pump is preferably of a type for manual operation through the same linkage operating the control valve 22 to permit the operator to quickly provide fluid to the brake from the auxiliary pump in the event of a pressure failure by actuating the control with the same motion as in normal operation.

The auxiliary pump comprises a piston 37 slidably disposed in a piston bore 38 defined by the valve housing.

A pump chamber 39 is also defined by the valve housing to be in communication with the piston bore. The piston 37 is connected with the linkage 36 by a link 41 to a rod 43 which is connected to the piston and extends from the housing 28. When the operator rotates the lever 34 in a counterclockwise direction to provide fluid to the brake, the piston is urged toward the pump chamber and returns to its rightward position when the lever 34 is turned in a clockwise direction. A pump outlet conduit 44 communicates with the pump chamber by means of a port 46 and has a check valve 47 which permits fluid flow out of the pump chamber and into the conduit in response to operation of the piston. A pump inlet conduit 48 communicates with the pump chamber by means of a port 49 and with a fluid sump 51. A check valve 52 is disposed across the conduit 48 and permits fluid to flow from the sump into the pump chamber when the piston is moved rightwardly in its bore but prevents return flow from the pump chamber to the sump. The conduit 48 is located generally above the pump chamber so that fluid from the pump chamber does not leak back to the sump. Normal operation of the control valve tends to make up fluid lost from the chamber by leakage, for example, through the check valve 47. Thus, the pump chamber tends to remain filled with fluid and minimum pump operation will provide fluid to the brake in the event of a pressure failure.

A particular purpose of the relay valve is to isolate the primary source and the control vlave 22 and communicate the auxiliary pump to the brake in the event of a pressure failure so that a minimum amount of fluid from the auxiliary pump will release the brake. To perform the functions described above, the relay valve comprises a bore 53 in the valve housing with a relay valve spool 54 disposed for longitudinal motion in the bore. The conduits 26, 27, 23 and 44 are each communicated with the bore 53 by an inlet port and annular recess about the bore, each port and bore pair indicated respectively at 56, 57, 58 and 59. A spring 61 is interposed between the valve housing and the left end of the relay valve spool to urge the spool rightwardly in the bore. In this position, the auxiliary pump is communicated to the brake through ports 59 and 58 together with the spool bore. The primary source and the control valve are now isolated from the bridge and the auxiliary pump. However, fluid pressure from the primary source is communicated into the right end of the relay spool bore through the port 56. Normal fluid pressure from the source overcomes the spring 61 to shift the spool leftwardly in its bore. In this position, the fluid outlet conduit 27 from the control valve is in communication with the brake by means of ports 57 and 58 together with the spool bore to permit normal operation of the brake in response to the valve portion 32 of the control valve.

Some pumping action results in the auxiliary pump from normal operation of the control valve by the linkage 36 as noted above. To relieve excess fluid pressure from the pump during normal operation, the relay valve bore has an annular recess 62 communicated to a fluid drain 63 through a port 64. The annular recess 62 is located generally at the left end of the spool bore. When the spool is shifted rightwardly by the spring, it isolates the drain from the auxiliary pump and permits fluid to pass from the auxiliary pump into the brake. However, when the spool is shifted leftwardly against the spring by fluid pressure from the primary source, the auxiliary pump conduit 44 is communicated to the drain 63 through the spool bore.

We claim:
1. An override assembly for providing fluid pressure to hydraulically actuated means in the event of pressure failure of a primary fluid source, comprising in combination
    auxiliary pump means operable separately from the fluid source,
    a relay valve in communication with said auxiliary pump, the fluid source and the hydraulically actuated means, and
    valve means disposed in said relay valve and normally permitting fluid communication between the auxiliary pump means and the hydraulically actuated means while isolating the fluid source, said valve means shifted by fluid pressure from the fluid source to communicate the fluid source with the hydraulically actuated means.

2. The combination of claim 1 wherein a control valve is interposed between the source and said relay valve to normally control operation of the hydraulically actuated means,
    said relay valve defines a bore communicated with said auxiliary pump, the hydraulically actuated means and the control valve by separate ports in said relay valve, and
    said valve means is a spring-loaded spool disposed in said relay valve bore, said relay valve having another port in direct communication with the fluid source and its bore to permit fluid source pressure to urge the spool against its spring load.

3. The combination of claim 2 wherein said auxiliary pump is manually operable by means which also operate the control valve and the relay valve has a drain port which is in communication with auxiliary pump port only when the spool is shifted against its spring load by fluid pressure from the source.

4. The combination of claim 3 wherein
    said auxiliary pump comprises a piston disposed for longitudinal pumping motion in a pump chamber, the pump chamber being in communication with a fluid tank and the relay valve by check valves permitting fluid flow only from the tank through the pump chamber to the relay valve and
    the piston has a connection with the manual operating means for pump operation according to preferred motion of the manual control means.

5. The combination of claim 2 wherein the hydraulically actuated means is a normally engaged brake of a cable control unit and the control valve is of a type employed in cable control units and has a valve portion for controlling fluid flow to the brake and a valve portion for controlling fluid flow to a clutch for clutch engagement, said fluid source override being associated with the valve portion controlling fluid flow to the brake.

References Cited
UNITED STATES PATENTS

| | | | |
|---|---|---|---|
| 2,293,542 | 8/1942 | Hamilton | 60—60 XR |
| 2,323,519 | 7/1943 | Dean. | |
| 2,601,405 | 6/1952 | Link. | |
| 2,674,854 | 4/1954 | Church | 60—102 |

EDGAR W. GEOGHEGAN, *Primary Examiner.*

U.S. Cl. X.R.

60—53; 317—234